United States Patent [19]

Inokuchi

[11] Patent Number: 5,035,486
[45] Date of Patent: Jul. 30, 1991

[54] OPTICAL IMAGING APPARATUS

[75] Inventor: Toshiyuki Inokuchi, Tokyo, Japan

[73] Assignee: Ricoh Company, Ltd., Tokyo, Japan

[21] Appl. No.: 319,847

[22] Filed: Mar. 6, 1989

Related U.S. Application Data

[63] Continuation of Ser. No. 93,282, Sep. 4, 1987, abandoned, which is a continuation of Ser. No. 235,237, Feb. 17, 1981, abandoned.

[30] Foreign Application Priority Data

| Feb. 22, 1980 | [JP] | Japan | 55-21386 |
| Mar. 12, 1980 | [JP] | Japan | 55-31099 |
| Apr. 4, 1980 | [JP] | Japan | 55-44330 |
| Apr. 4, 1980 | [JP] | Japan | 55-44331 |
| Aug. 15, 1980 | [JP] | Japan | 55-112491 |

[51] Int. Cl.$^5$ .................................................. G02B 27/00
[52] U.S. Cl. ................................... 350/167; 350/103
[58] Field of Search ............... 350/107, 103, 106, 109, 350/167

[56] References Cited

U.S. PATENT DOCUMENTS

| 2,406,798 | 9/1946 | Burroughs | 350/446 |
| 3,166,625 | 1/1965 | Brumley | 350/167 |
| 3,966,301 | 6/1976 | Brown | 350/129 |

Primary Examiner—Paul M. Dzierzynski
Attorney, Agent, or Firm—David G. Alexander

[57] ABSTRACT

An optical imaging apparatus according to the present invention comprises a flat multilens array having a number of lenses arranged in a row and a flat multiprism array having a number of prisms also arranged in a row and located behind the multilens array such that its individual prisms are aligned with the individual lenses. Two prism surfaces (flat reflecting surfaces) are positioned at one side and a single lens surface (curved surface) at the other and multiple combinations of such surfaces are lined up in an array. Each lens or each prism has on its front end a light intercepting screen plate having a substantially oblong opening which is shorter in the direction of the array and longer in a direction perpendicular thereto, or the aperture of each prism and/or each lens itself is shaped so. For the correction of abberations, one or more additional lenses of different curvatures are stacked on the front end of each lens to constitute a composite lens system. The multiprism array is replacable by a multiroof prism array.

19 Claims, 18 Drawing Sheets

OPTICAL IMAGING APPARATUS

CROSS REFERENCE TO RELATED APPLICATION

This application is a continuation of U.S. Pat. application Ser. No. 07/093,282, filed Sept. 4, 1987, now abandoned, which is a continuation of U.S. Pat. application Ser. No. 235,237, filed Feb. 17, 1981, now abandoned.

BACKGROUND OF THE INVENTION

The present invention generally relates to optical systems and, more particularly, to an improved imaging apparatus of a small size whose application is in the optical exposure system of an electrophotographic copying machine or a graphic data reading device of a data processing input/output equipment for instance.

Various imaging systems have heretofore been proposed to provide an optical exposure system of an electrophotographic copying machine. A first type of system holds an imaging lens or an optical system stationary and move a document or a platen and a photosensitive member in timed relation to each other (synchronous movement type). A second type of system keeps a document or a platen fixed in place and moves a first mirror and a photosensitive element at a common velocity while driving a second mirror at a velocity half the velocity of the first mirror (mirror scan type). A third type of system moves a lens box relative to a document or a platen and a photosensitive member each held stationary (lens box scan type). All of these known optical systems are advantageous in one aspect but disadvantageous in another. For instance, where an object to be copies is a book or like bulky document, the second or third type of system mentioned in which the document or the platen remains stationary is advantageous over the first type of system which moves it.

A demand recently made on copiers is, among others, for a reduction of its overall size. This is naturally reflected by a demand for a small sized optical exposing system installed in a copier. To meet such a demand, discussion is now under way in the industry concerned to replace the traditional lenses with an array of optic image transmitting fibers or an array of microlenses as an image forming element of the optical exposing system. An image transmitting optic fiber is a rod-like transparent element or rod lens of a diameter of about 1 mm and whose refractive index varies parabolically from its center radially to its perimeter. When provided with a suitable length, a single optic fiber can form an erected equisized actual image of an object without any assistance. To construct an optical exposure system for practical use, multiple such elements having the same length, refractive index and diameter are line up in a row or array. A microlens array on the other hand comprises a number of microlenses common in curvature, refractive index and diameter arranged to form an array. Being a kind of spherical lenses, the microlens array needs at least three microlenses or microlense arrays superposed on the same optical axis in order that it can focus an erected equisized actual image of an object. A major drawback inherent in the optic fiber array is that each of its element must be processed by ion exchange or the like to vary the refractive index and such elements must be assembled into an array, which makes the production uneasy and adds to the cost. This also holds true in the case of the microlens array because a number of microlenses must have their optical axes exactly aligned together and light interception is indispensable between neighboring microlenses.

Prior art techniques concerned with microlens arrays include one disclosed in Japanese Patent Publication 49-8893 in which three flat microlens arrays are superposed to project an erected equisized image of an object However, difficulty is experienced in aligning the optical axes of the three independent lenses on a common optical axis and the six convex surfaces in total build up considerable abberations. Another known technique resides in superposing two relatively thick telecentric microlens arrays to form an erected equisized image as disclosed in Japanese Patent Application 53-122426 layed open to public inspection. This telecentric system is neither acceptable due to great flaring attributable to the thick lenses and due to difficult production. It has additional drawbacks that each lens array in the form of an integral flat molding must be bodily wasted when even one of the lenses is found inferior and that all the lenses in an array cannot be provided with identical performance without difficulty.

The imaging elements discussed have characteristically short focal lengths which enable them to reduce the overall dimensions of copiers. For this very reason, they are not suited for use with an optical exposure system of the aforementioned mirror scan type or the lens box scan type that commonly needs a long focal length. That is, an effort to have a long focal length with such an imaging element deprives it of the merit in making the whole apparatus small-sized. A prism and lens assembly is known as another imaging element which sets up a relatively long focal length while reducing the dimensions of an apparatus in which it will be incorporated. The prism and lens assembly has a triangular prism behind a spherical lens and can cut the distance between the lens and prism very short even if the focal length of the lens :s made long. It is possible therefore to arrange multiple such prism and lens assemblies in an array and effectively utilize this array as an imaging element of an optical exposure system of the mirror scan type or of the lens box scan type.

Prism and lens arrays known in the present stage of development all need, however, time consuming assembling work of independent lens elements and prism elements. This accompanies troublesome production, assembly and adjustment as well as disproportionate time required which promote an increase in the cost.

SUMMARY OF THE INVENTION

An optical imaging apparatus embodying the present invention comprises at least a flat multi-refractive array having a number of refracting elements arranged in a row and at least a flat multi-reflective array having a number of reflecting elements arranged in a row and located behind the multi-refractive array such that the individual reflecting elements are aligned with the individual reflecting elements.

Another optical imaging apparatus embodying the present invention comprises at least a single array having a number of reflective and refractive elements, each element having two reflecting surfaces at one side and a single refracting surface at the other side and at least a mounting member or frame for retaining the individual elements in such a manner as to form said single array.

In one aspect of the present invention, there is provided an optical imaging apparatus using an integrally formed flat prism and lens array. The imaging apparatus comprises a multilens array having numerous lenses arranged in a row and formed flat integrally and a multiprism array having numerous prisms arranged also in a row and formed flat integrally. These two arrays constitute together a multiprism and lens array with the prisms held in correspondence with the lenses.

In another aspect of the present invention, there is provided an optical imaging apparatus which has each two prism surfaces (flat reflective surfaces) at one side and a single lens surface (curved surface) at the other side, such prism surfaces and lens surfaces being lined up in an array.

In still another aspect of the present invention, there is provided an optical imaging apparatus which comprises a roof prism and lens array employing a multiroof prism array in place of the multiprism array.

In a farther aspect of the present invention, there is provided an optical imaging apparatus having the roof prism and lens array and a reflecting member in combination and an optical imaging apparatus which has the roof prism and lens array and reflector built in a line scanning device.

Due to its physical properties, a prism and lens array in practical use must have as large an image angle as possible in a direction perpendicular to the array. If the image angle of each prism lens in the array is increased, however, the overlap degree of peripheral image portions (overlapping density of image fragments or amounts of light) will become excessively large in the direction of the array. To cope with this, prism and lenses may be lined up to a minimum density so as to keep down the overlap of the peripheral image portions as far as possible. This still involves, however, various critical problems in the aspect of practical use not to speak of an irregular light amount distribution. Though the resolving ability may be acceptable around the optical axis of each lens, it inevitably degrades in a peripheral area of the lens partly because the resolving power of the lens itself falls in the peripheral area, partly because the image fragments overlap each other in regions where distortion is significant, and partly because interlens parts of the array tend to be dislocated. The result is the degradation of the image quality in the direction of the array.

A prism and lens array applicable to the present invention has individual lenses and prisms arranged to as high a density as possible and makes the effective image angle of each lens as narrow as possible within an allowable range along the direction of the array but as wide as possible in a direction perpendicular to the array. This specific arrangement and construction of the array may be achieved by locating a light intercepting screen plate on the front end of each lens or that of each prism which has a rectangular opening shorter in the direction of the array and longer in a direction perpendicular thereto. Alternatively, the aperture portion of each prism or that of each lens may be so shaped itself.

Another form of the prism and lens array applicable to the invention is in a composite lens system having one or more additional lenses of different curvatures stacked on the front end of each lens. This will improve the performance of each lens, that is, correct various abberations of each lens. The additional lens or lenses will also be formed in a flat lens array or arrays.

It is an object of the present invention to provide an improved optical imaging apparatus which is free from the disadvantages inherent in the prior art apparatus.

It is another object of the present invention to provide an optical imaging apparatus using a prism and lens array and having a relatively long focal length.

It is another object of the present invention to provide an optical imaging apparatus capable of focusing an erected equisized actual image with a simple arrangement.

It is another object of the present invention to provide an improved prism and lens array which comprises a prism and lens array of a wide image angle and yet minimizes the overlap of peripheral image portions in the direction of the array.

It is another object of the present invention to provide a prism and lens array which prevents abberations from being enhanced by reducing the number of curved surfaces in the optical system as far as possible.

It is still another object of the present invention to provide a mirror scan type optical imaging apparatus using a flat prism and lens array.

It is yet another object of the present invention to provide a lens box scan type optical imaging apparatus using a lens box which has a flat prism and lens array built therein.

It is a further object of the present invention to provide a synchronous movement type optical imaging apparatus using a flat prism and lens array.

It is yet a further object of the present invention to provide a generally improved optical imaging apparatus.

Other objects, together with the foregoing, are attained in the embodiments described in the following description and illustrated in the accompanying drawings.

DESCRIPTION OF THE PREFERRED EMBODIMENTS

While the optical imaging apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
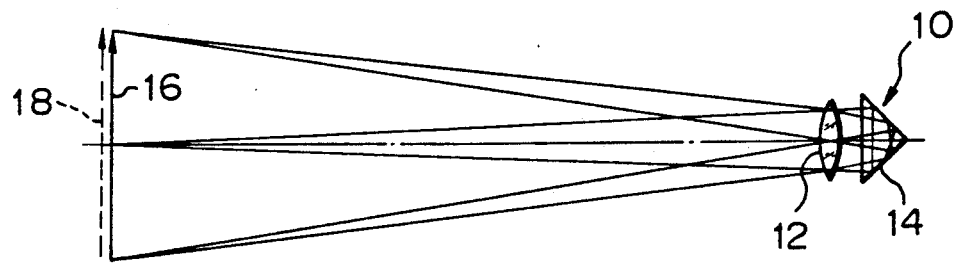
FIG. 1 shows optical paths of light beams with a prism and lens assembly seen from the above for illustrating the imaging principle of the present invention.
Figure 2:
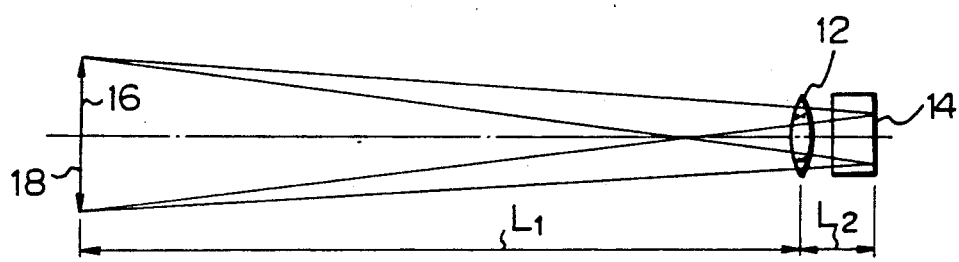
FIG. 2 corresponds to FIG. 1 but shows the prism and lens assembly and optical paths in side elevation.

Referring now to FIGS. 1 and 2 of the drawings, an image forming system using a prism and lens assembly is illustrated. The prism and lens assembly generally denoted by the reference numeral 10 comprises a spherical lens 12 and a triangular prism 14 behind the spherical lens 12. Imaginary paths of light beams to and from the prism-lens 10 are shown in top plan in FIG. 1 and in side elevation in FIG. 2. As seen from these drawings, the prism and lens assembly 10 focuses the light beams from an object 16 into an image 18 which is erected, equisized in the horizontal direction and inverted, equisized in the vertical direction. A prism and lens assembly of the kind set forth can set up a relatively long focal length without adding to the overall dimensions of an apparatus in which it will be installed. This will be accounted for by the distance $L_2$ from the lens 12 to the prism 14 which can remain very small against an increase in the distance $L_1$ from the object 16 to the lens 12. Such an assembly is therefore applicable even to a mirror scan type optical system if the focal length is made suitably long. Size reduction of the whole apparatus can be attained merely by arranging plural small-sized prism and lens assembly into an array.

A prism and lens array usable for an optical system of the present invention has a distinguishable feature that it consists of a flat integral assembly of a lens array and a prism array prepared by molding them together using plastics or like material. The term 'integral' refers to what will be fully defined hereinafter. Such a unique prism and lens assembly can be produced commercially on quantity basis and is easy to produce, assembly and adjust, which naturally affords a significant cut-down in cost.

Figure 3:
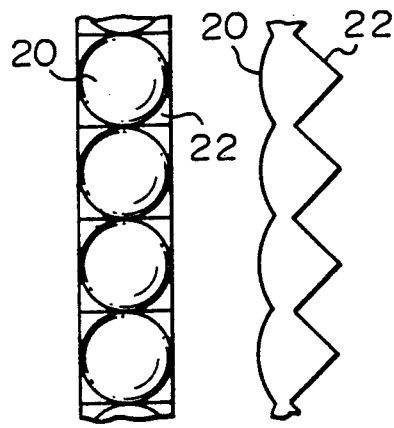
FIGS. 3 and 4 illustrate different embodiments of a prism and lens array according to the present invention each showing it in plan in a right-hand part and in side elevation in a left-land part.
Figure 4:
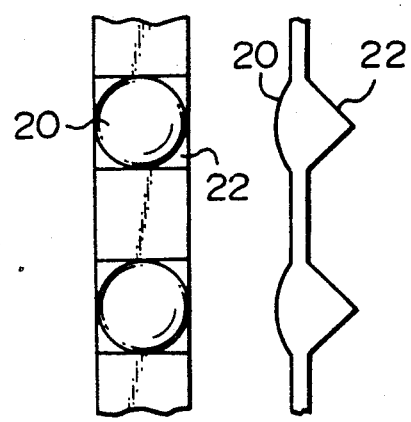

FIGS. 3 and 4 show prism and lens arrays each having a lens array 20 and a prism array 22 molded together integrally and simultaneously. FIGS. 5-9 on the other hand show prism and lens arrays each of which has a lens array 20 and prism array 22 molded individually and then cemented together or interconnected at a preselected spacing. The 'integral' assembly implies herein all of such configurations and arrangements of lens arrays and prism arrays. While each lens in a lens array 20 may present a circular front view, it is preferably of a rectangle in conformity with its associated prism. The integral array throughout its whole length is not essential but may be replaced by an array made up of plural sub-arrays arranged in a row. This alternative type of array should be taken to be also meant by the term 'integral'.

Figure 5:
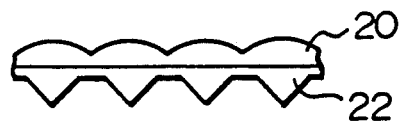
FIGS. 5-9 are fragmentary plan views of various other embodiments of a prism and lens array according to the present invention.
Figure 6:
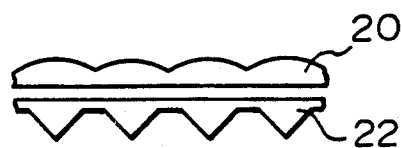
Figure 7:
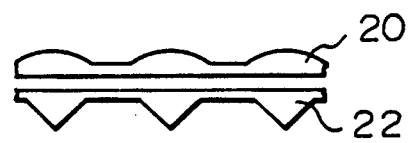
Figure 8:
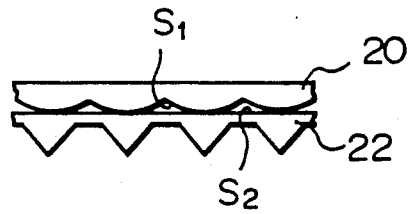
Figure 9:
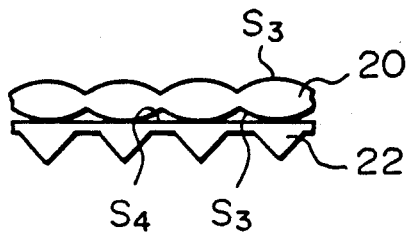
Figure 10:
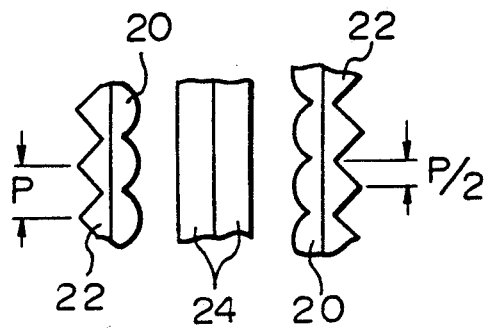
FIGS. 10-12 illustrate arrangements for avoiding an uneven light amount distribution liable to be entailed by the use of a prism and lens array according to the present invention together with a diagram demonstrating an effect obtainable therewith.
Figure 11:
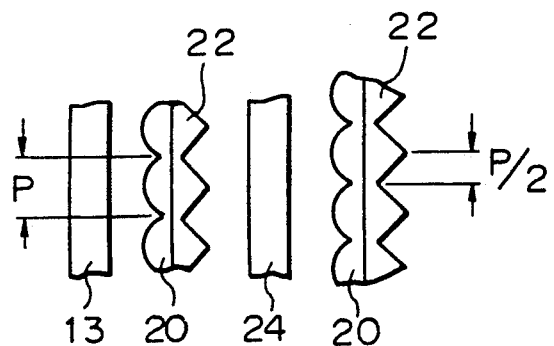

In FIGS. 3 and 4, each imaging element according to the invention is shown in side elevation at the right-hand side and in plan at the left-hand side. The element in FIG. 3 has the most dense arrangement of prisms 22 and lens surfaces 20 formed by the curvatures of their aperture portions. The element in FIG. 4 has prisms 22 and lens surfaces 20 at spaced locations along its length. An imaging element shown in FIG. 5 includes a sheet of multilens array formed integrally of plastics by molding to resemble interconnected numerous plano-convex lenses 20. This sheet is cemented back-to-back to a counterpart consisting of a sheet of multiprism array which resembles interconnected numerous prisms 22 whose one side is flat. The sheet of multiprism array also comprises an integral molding of plastics or the like. In cementing the two sheets together, the individual lenses 20 and individual prisms 22 are placed in alignment. A first modification to the assembly of FIG. 5 arranges the lens array and prism array at a spacing from each other as viewed in FIG. 6. In a second modification shown in FIG. 7, a sheet of multilens array having spaced lenses 20 and a sheet of multiprism array having prism 22 spaced commonly to the lenses 20 are held at a spacing in back-to-back opposing relation. In a third modified form shown in FIG. 8, the multilens array sheet shown in FIG. 5 or 6 is cemented to the multiprism array sheet of the same drawing with the lens surface $S_1$ of the former abutting against the flat surface $S_2$ of the latter. In a fourth modified form shown in FIG. 9, a sheet of multilens array has opposite lens surfaces $S_3$ appearing to form a train of double convex lenses and is cemented at one lens surface $S_3$ to a flat surface $S_4$ of a sheet of multiprism array.

Figure 12:
Figure 13:
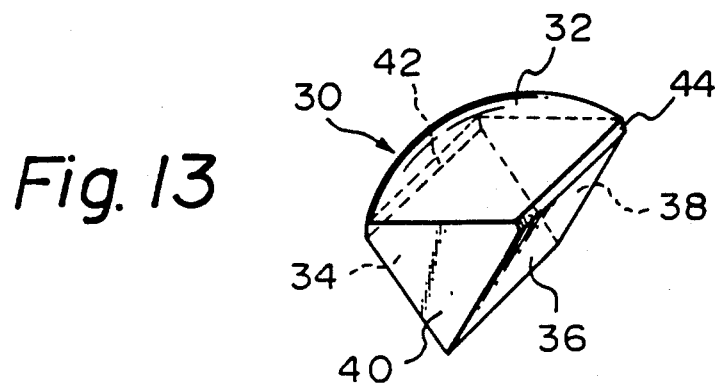
FIG. 13 shows in perspective a prism and lens element representing another embodiment of the present invention.
Figure 14:
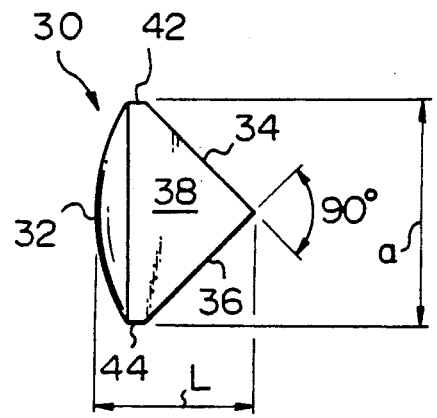
FIG. 14 is a plan view of the prism and lens element of FIG. 13.
Figure 15:
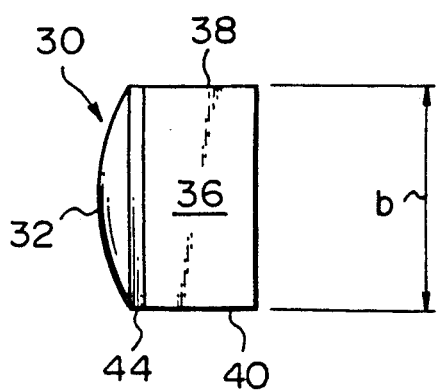
FIG. 15 is a front view of the same prism and lens element.

Generally, an imaging element of any of the types described tends to bring about periodic irregularity in the light amount distribution. To settle this problem, there may be employed a back-to-back connected triangular mirrors 24 and two imaging elements at opposite sides of the mirrors 24. The opposite imaging elements will be so located relative to each other that their pitches deviate by $\frac{1}{2}$ P where P is the distance (pitch) between the apexes of adjacent prisms on each multiprism array. This obviates the irregular distribution of light amounts as indicated in FIG. 12 by superposing the tops and bottoms of the light amount curves. Use may be made of prisms in place of the triangular mirrors to result the same effect.

Another embodiment of the present invention is illustrated in FIGS. 13-17. A prism and lens element 30 has a curved surface 32, flat reflecting surfaces 34 and 36 contiguous with the curved surface 32 and converging to each other at right angles, and parallel side surfaces 38 and 40 which connect perpendicularly to the reflecting surfaces 34 and 36. These four flat surfaces 34, 36, 38, 40 provide a rectangular perimeter to the curved surface 32. The prism and lens element 30 also has parallel narrow surfaces 42 and 44 each bordering the curved surface 32 at one side and the reflecting surface 34 or 36 at the other. These narrow surfaces 42 and 44 will serve as pilot surfaces when the prism lens is loaded on a mount as will appear. The prism and lens element 30 is shown in plan in FIG. 14 and in front elevation in FIG. 15. Of the dimensions a and b of the prism and lens element, the dimension b is equal to or larger than the dimension a. Such a prism and lens element is prepared as by injection molding plastics or grinding glass. To avoid flaring, it is preferable that the surfaces of the prism and lens element 30 except the curved surface 32 and reflecting surfaces 34, 36 be roughened and then blackened for avoiding reflection. As ordinary lenses, the curved surface 34 may be provided with an antireflection coating with or without a color correcting multi-film coating. Furthermore, additional lenses may be associated with the curved surface 34 in order to correct various abberations.

Figure 16:
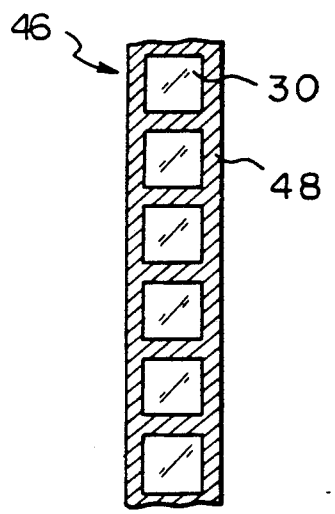
FIG. 16 shows in sectional plan a prism and lens array having prism and lens elements of the kind shown in FIG. 13 lined up in an array.

A prism and lens array 46 employing such elements 30 is depicted in sectional side elevation in FIG. 16.

Figure 17:
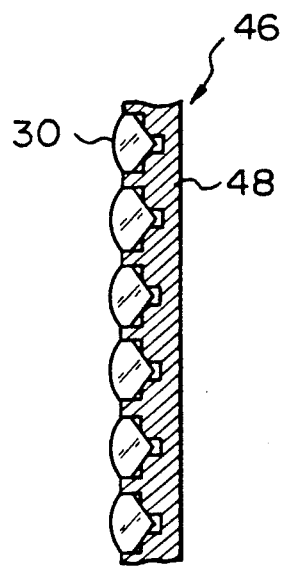
FIG. 17 is a sectional plan of the prism and lens array shown in FIG. 16.

FIG. 17 shows the array 46 in sectional plan. As shown the prism and lens array 46 has a mounting member or frame 48 formed with a train of equidistant recesses each having a rectangular section. Embedded in these recesses are a corresponding number of prism and lens elements 30 which are common in dimensions and performance. The prism and lens elements 30 in the recesses have their optical axes held in parallel and their curved surfaces 32 faced outward. The parallel location of the optical axes of the prism and lens elements on the frame 48 can be achieved simply by seating them in the spaced recesses. This is naturally under the condition that the narrow guide surfaces 42, 44 of each prism and lens element 30 have been precision finished parallel to the optical axis of the prism and lens element and those surfaces of the frame 48 for bearing the lens surfaces 42, 44 are in precise parallelism. The prism and lens elements 30 are secured to the frame 48 by adhesion, screwing, calking or any other suitable technique. The configuration of the frame 48 is a matter of design choice as long as it can arrange and retain the prism and lens elements as a single array. It will be noted that the prism and lens elements may be arranged in spaced positions as illustrated or in contacting positions as the case may be.

Figure 18:
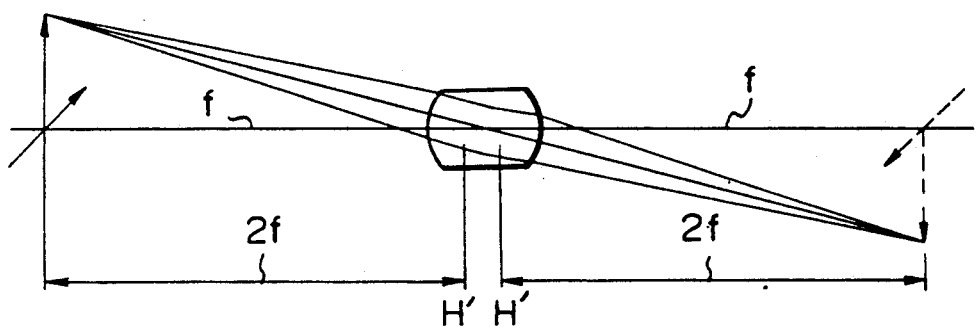
FIG. 18 is a diagram showing optical paths of light beams through the prism and lens array indicated in FIGS. 16 and 17.
Figure 19:
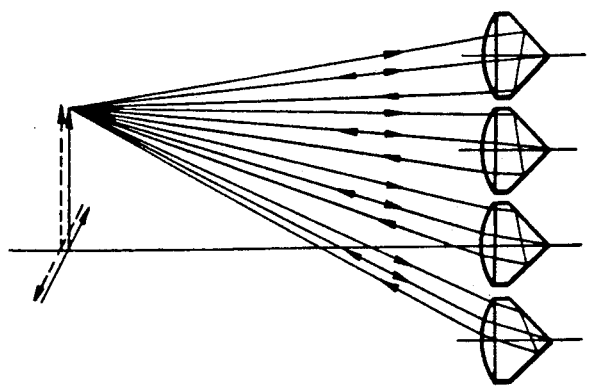
FIG. 19 shows optical paths through the prism and lens array of FIG. 18 with the array seen from the above.
Figure 20:
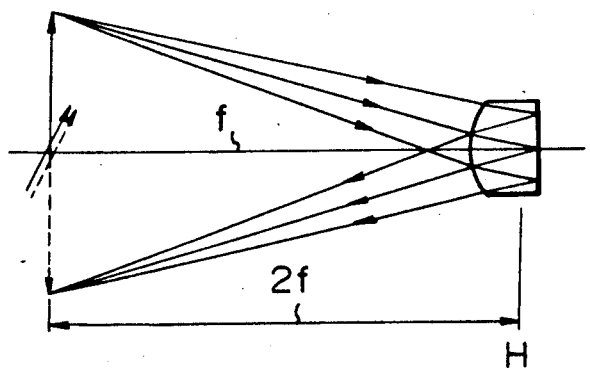
FIG. 20 shows optical paths with the prism and lens array of FIG. 18 seen from the front.

Supposing a prism and lens element without a prism, its balance in the form of a single lens will have optical imaging paths shown in FIG. 18. This lens functions exactly alike ordinary lenses so that an object spaced from the lens by double its focal length f or 2f, will form itself in an inverted equisized image spaced the same distance 2f but at the other side of the lens. In contrast, a complete prism and lens element will form an image which is erected and equisized when viewed from the above as depicted in FIG. 19 but inverted and equisized when viewed from the front as shown in FIG. 20. Therefore, prism and lens elements lined up in an array in a common plane as indicated in FIG. 19 will connect image fragments together to form a complete image. This is the characteristic feature of an erected actual image type optical system.

A prism and lens array according to the invention, similarly to an array of image transmitter fibers, can be installed in an optical exposure system of a scan type copying machine as an erected, equisized, actual image type optical assembly. For this purpose, a pair of mirror surfaces 50 and 52 may be disposed ahead of the prism and lens array 46 and connected together each at an angle of 45° to the optical axis of the prism and lens array. The two reflecting surfaces 50 and 52 may be formed by a single prism if desired.

Figure 21:
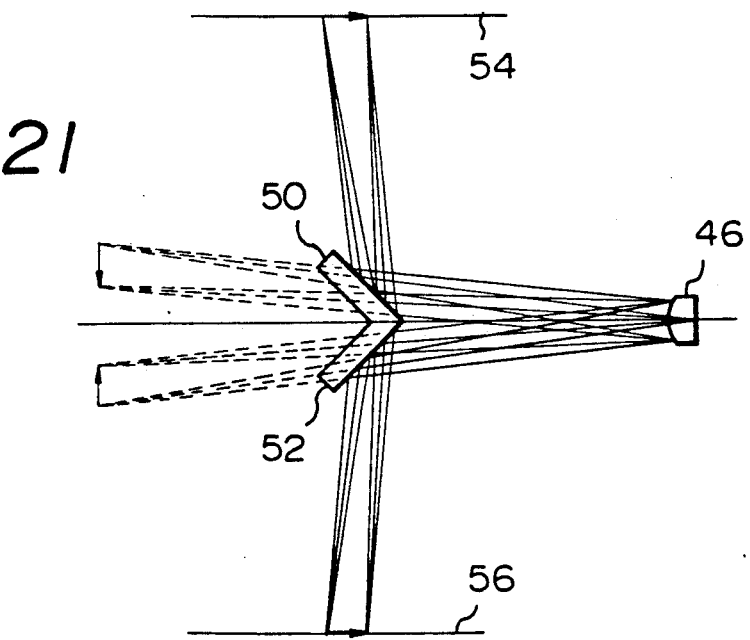
FIG. 21 shows optical paths of an embodiment using the prism and lens array indicated in FIGS. 16 and 17.

The prism and lens array according to the invention may be designed as will be described by way of example. A prism and lens element is made of methyl methacrylate having a refractive index of 1.491 and provided with a radius of curvature R of 30 mm at its curved surface and L a distance L of 2.92 mm from the crown of its lens to the apex of its prism. The focal length f of this lens is therefore 31.56 mm. A light image of an object spaced 61.1 mm from the lens crown will be focussed with the same size as the object at a position also spaced 61.1 mm from the lens crown. A prism and lens array is formed by lining up multiple prism and lens elements each of which has a square aperture lens dimensioned 3.5 mm each side or 5 mm diagonal. When installed in an optical system as shown in FIG. 21, this prism and lens array will define a distance of 64 mm between an object plane 54 and an image plane 56 and, in this way, achieve a very high resolution in association with the scanning exposure system of a copying machine. Individual prism and lens elements in an array have abberations substantially proportional to the focal length f. In such an optical system as one shown in FIG. 21, abberations of lenses can remain within a favorable range at radii of curvature R of lenses less than 60 mm, meaning focal lengths less than nearly 60 mm, and at distances to an object of up to about −30 120 mm.

Figure 22:
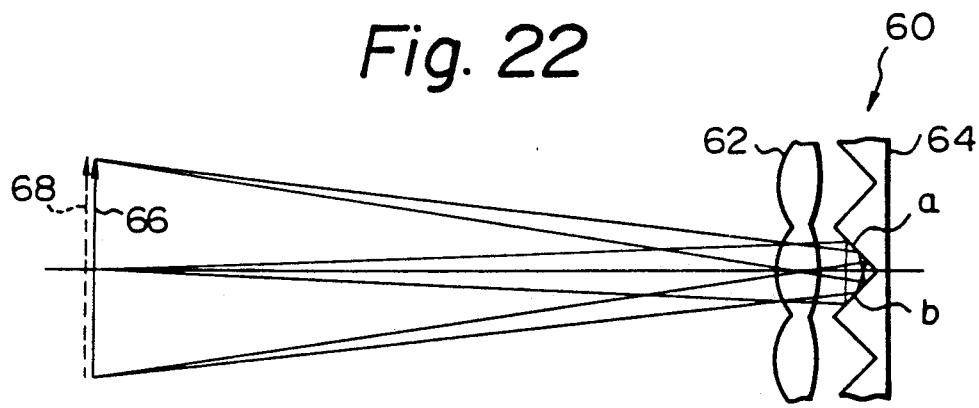
FIG. 22 is a schematic plan illustrating the imaging function of a roof prism and lens array according to the present invention.
Figure 23:
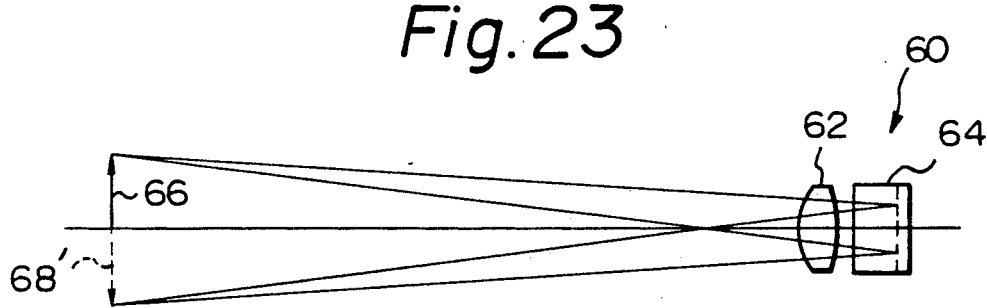
FIG. 23 shows the roof prism and lens array in schematic side elevation.

Referring to FIGS. 22-25, there is shown another embodiment of the present invention which replaces the prism array in the foregoing embodiments with a roof prism array. A roof prism and lens array according to this embodiment in identical in the image forming principle to the prism and lens arrays already discussed. As viewed in FIGS. 22 and 23, the roof prism and lens array denoted as 60 comprises a multilens array 62 in the form of a flat sheet with multiple lenses arranged thereon in a row and multiroof prism array 64 located behind the multilens array 62 and having multiple roof prisms lined up in a sheet. The arrays 62 and 64 have their lenses and roof prisms held in alignment. The combination of a lens and a roof prism forms the image of an object 66 which is erected and actual as at 68 viewed in a top plan and inverted and actual as at 68′ viewed in a side elevation. Thus, arranging such lenses and prisms in a horizontal array as shown in FIG. 22 will combine image fragments into a full image.

Figure 24:
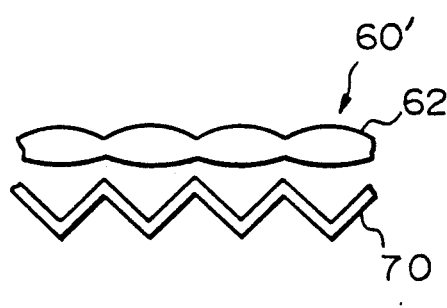
FIGS. 24 and 25 show in schematic plan other different embodiments of a roof prism array according to the present invention.
Figure 25:
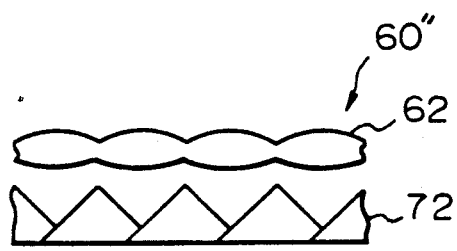

The multilens array 62 and multiroof prism array 64 can be molded each integrally with plastics or like material. This offers a marked improvement in the precision arrangement and a cut-down in cost. Each roof prism in the array 64 has reflecting surfaces a and b which are deposited by evaporation of aluminum or like process and, hence, the plastics or the like constituting the array 64 needs not always be transparent. FIG. 24 illustrates a modified roof prism array 70 whose thickness is the same throughout the length. This array 70 is free from the tendency to distortion which is inherent in molding plastics or like material into the array 64 shown in FIG. 22 due to the uneven thickness. FIG. 25 shows a farther modified roof prism array 72 consisting of multiple prism blocks cemented together as illustrated instead of a molding of plastics or the like. Another possible method of forming a roof prism array may be cutting suitably shaped recesses in a block.

Figure 26:
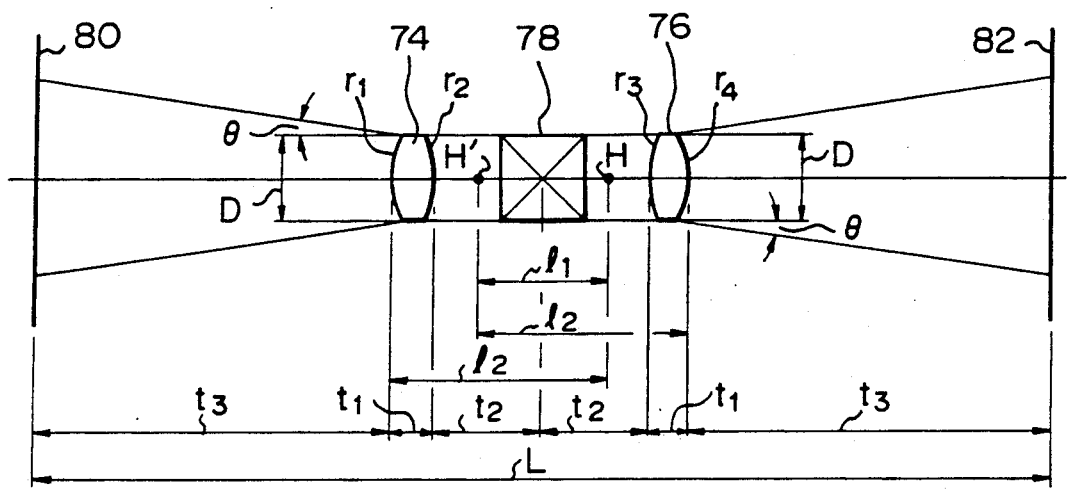
FIG. 26 shows a lens system equivalent to a roof prism and lens array indicated in FIGS. 22-25.

An optical system using a roof prism may be remodeled to facilitate its easy understanding into a symmetric optical system without a roof prism as illustrated in FIG. 26. In a roof prism and lens assembly, light beams from an object are passed through a lens and then reflected from a roof prism to form an image of the object again through the lens. This assembly is therefore equivalent to the illustrated arrangement of two identical lenses 74 and 76 and a single roof prism 78 between an object plane 80 and an image plane 82. Denoted by r in FIG. 26 is the radius of curvature of each lens, $\theta$ the half image angle of light, D the diameter of the lenses, H the first unit point, H′ the second unit point, $l_1$ the distance between the first and second unit points, $l_2$ the distance between each unit point H or H′ and the outside crown of a lens remote therefrom, $t_1$ the thickness of the lenses (distance between the opposite crowns of each lens), $t_2$ the distance between the inside crown of each lens and the roof prism ridge, $t_3$ the distance between the object plane (imaging plane) and a lens adjacent thereto, and L the distance between the object plane and the imaging plane. In FIG. 26, the various dimensions are determined as: $r_1 = 22.65$ mm, $r_2 = -84.191$ mm, $r_3 = -r_2 = 84.191$ mm, $r_4 = -r_1 = -22.65$ mm, $\theta = 10.1°$, $D = 8.6$ mm, $l_1 = 13.8$ mm, $l_2 = 22.5$ mm, $t_1 = 4.0$ mm, $t_2 = 11.6$ mm, $t_3 = 36.2$ mm, and $L = 103.6$ mm with a refractive index of 1.491 employed.

Figure 27:
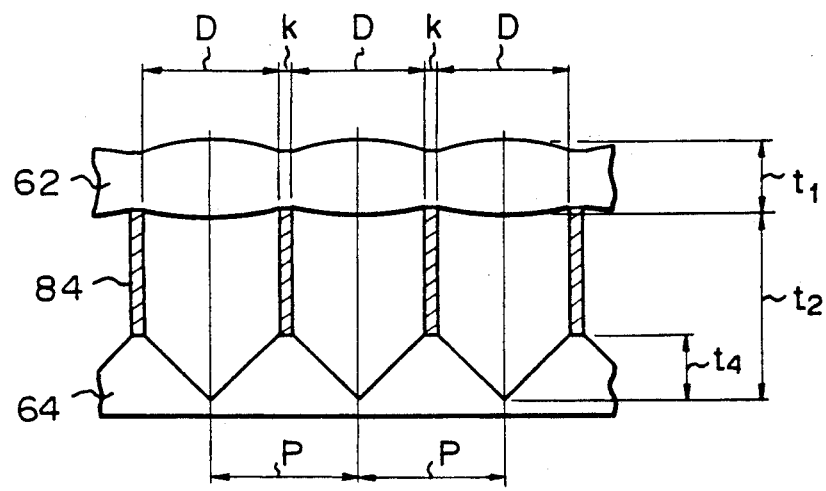
FIG. 27 shows various dimensions of a roof prism and lens array depicted in FIGS. 22 and 23.
Figure 28:
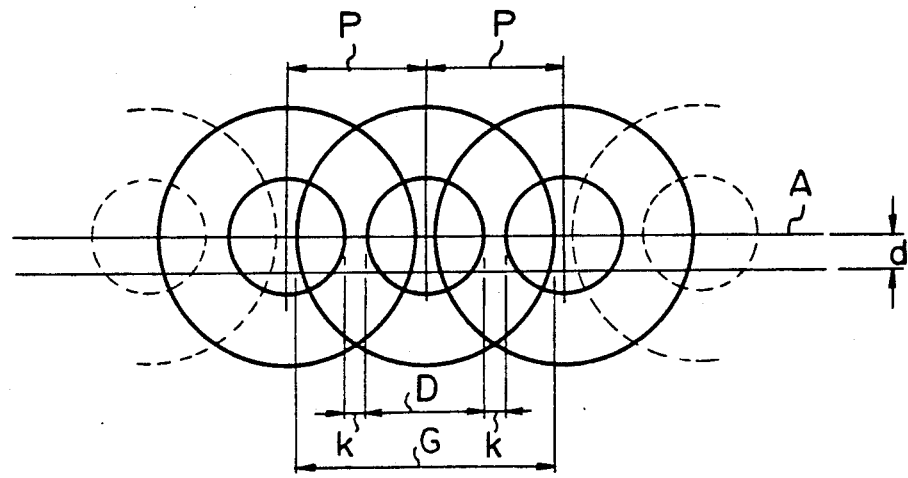
FIG. 28 is a diagram showing effective image regions of a roof prism and lens array shown in FIGS. 22-25.
Figure 29:
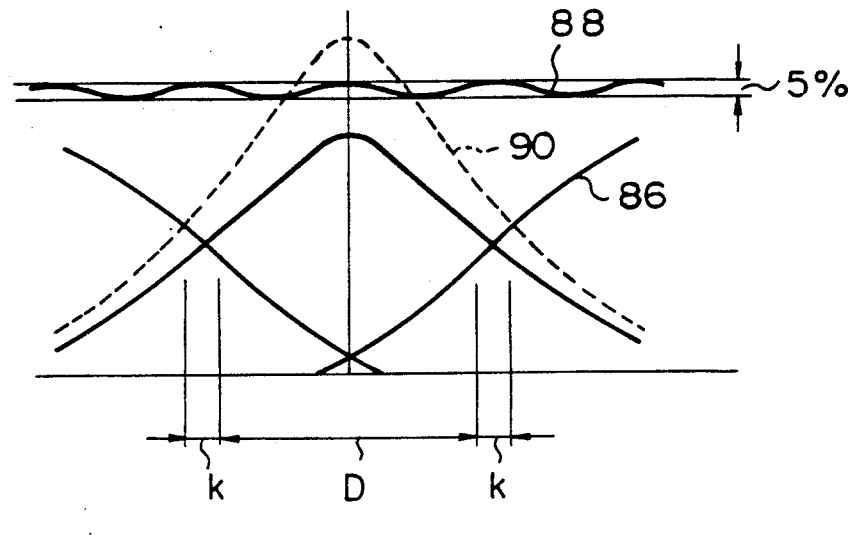
FIG. 29 shows curves representing light amount distributions in FIG. 28.

FIG. 27 shows a roof prism and lens array constructed using the various values mentioned above. Designated by the numeral 84 in FIG. 27 is a set of screen plates for interception of light. This lens array is designed with the lenses and prisms arranged at a pitch P of 9.2 mm, the lenses spaced $k = P - D = 0.6$ mm from neighboring ones, and the prisms provided with an effective height $t_4$ of 4.3 mm. Lenses in this array have a focal length f of 36.0 mm, an F number of 2.1 and an image angle of 28 or 20.2°. It will be seen that the lenses concerned are therefore clear and highly resolving provided with MTF at 5lp/min of over 60%. Meanwhile the pitch P of 9.2 mm of the lens and prism arrangement suppresses irregularity in the light amount distribution to less than 5% at a necessary scan line position. Suppose that roof prism-lenses having a diameter D of 8.6 mm are lined up in an array at a common distance or pitch P of 9.2 mm as shown in FIG. 28. Then a roof prism-lens will have a light amount distribution and a composite light amount distribution as shown in FIG. 29 at a slit position which is remote from the optical axis A by a distance d of 2.8 mm. Curve 86 in FIG. 29 indicates a light amount distribution on the optical axis A, curve 88 a composite light amount distribution and curve 90 a light amount distribution of the lens on the optical axis A. The diameter of the effective image surface is denoted by G in FIG. 28.

Figure 30:
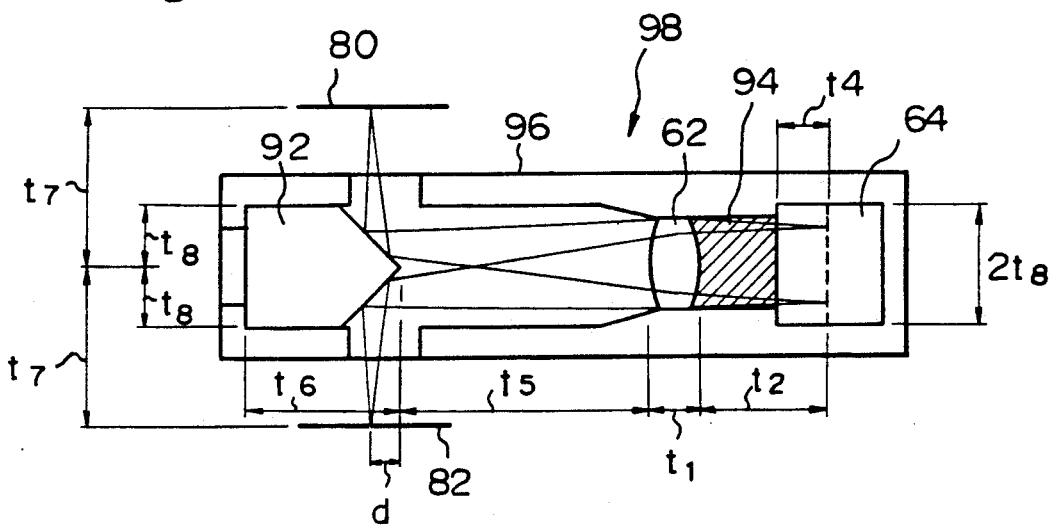
FIG. 30 illustrates an embodiment of an imaging apparatus using a roof prism and lens array of the kind shown in FIGS. 22-25.

FIG. 30 shows an exemplary image forming apparatus 98 which has a roof prism and lens array with the various dimensions discussed hereinabove and a right-angled mirror 92 ahead of the roof prism and lens array. These components of the apparatus are retained as an integral unit by a housing 96 together with light intercepting screens 94. This apparatus exemplifies one for line scanning and supposes heights of an object and an image thereof which are equal to the aforementioned distance d of 2.8 mm, this range defining the scan line position. Apart from the dimensions already mentioned, the diagram of FIG. 30 include dimensions $t_5 = 22.0$ mm, $t_6 = 14.0$ mm, $t_7 = 14.2$ mm and $t_8 = 5.0$ mm.

Figure 31:
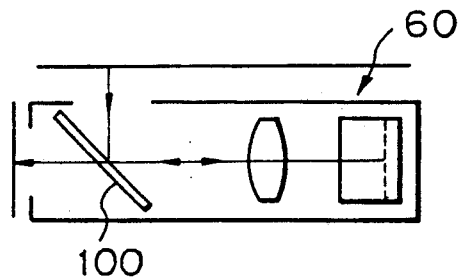
FIGS. 31-33 are schematic side elevations of other different embodiments of an imaging apparatus using a roof prism and lens assembly of the kind shown in FIGS. 22-25.
Figure 32:
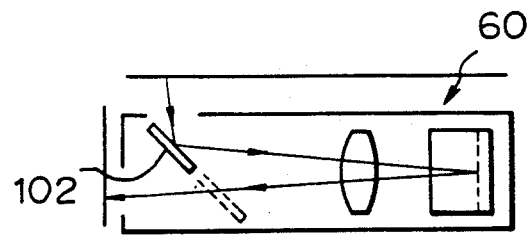
Figure 33:
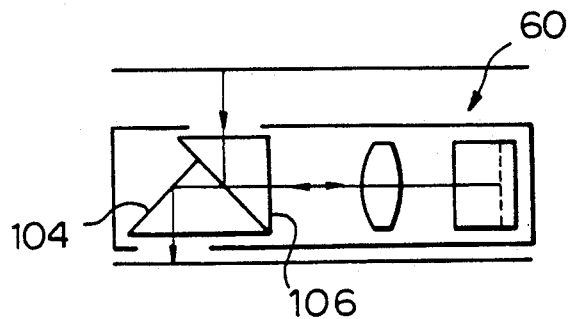

It will be noted that various other imaging apparatus can be constructed using a roof prism and lens array designed as shown in FIGS. 22-25. It will also be noted that the right-angled mirror 92 indicated in FIG. 30 may be replaced by a half-mirror 100 as shown in FIG. 31, by a mirror 102 in a light path from an object to the array 60 as shown in FIG. 32, or by a pair of right-angled prisms 104 and 106 as shown in FIG. 33.

A roof prism and lens array according to the invention can achieve a markedly improved imaging performance by suitable selection of its various optical dimensions.

Figure 34:
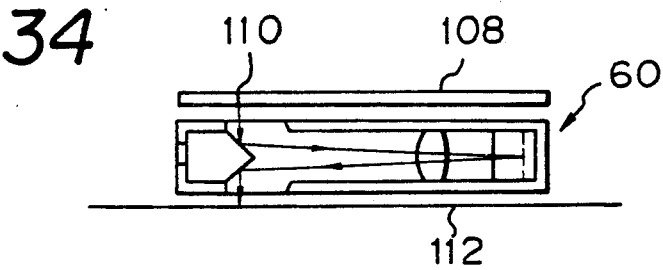
FIGS. 34-37 show in schematic side elevation different embodiments of a recording apparatus each incorporating a roof prism and lens array of the kind shown in FIGS. 22-25.
Figure 35:
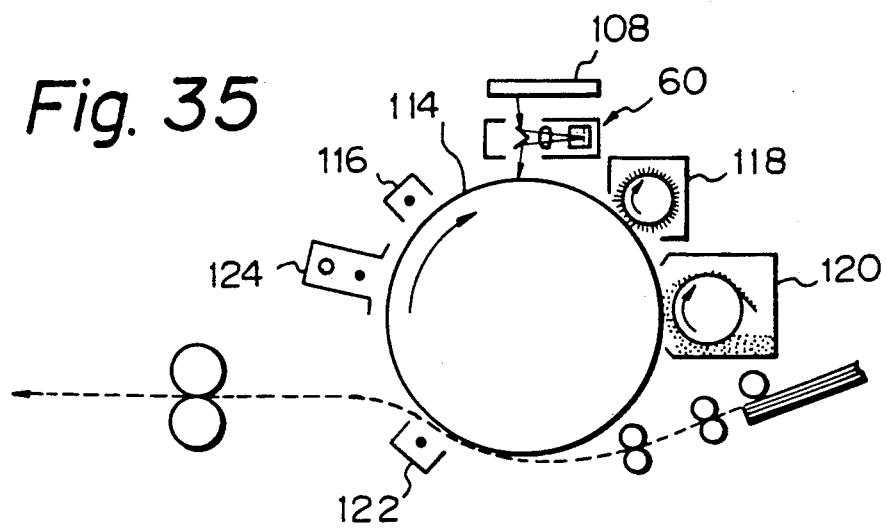
Figure 36:
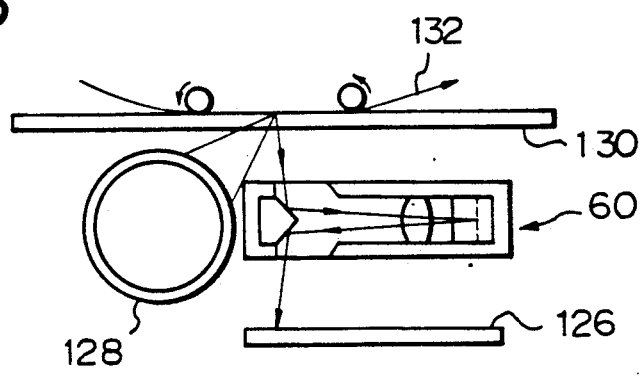

Referring to FIG. 34, there is illustrated a recording apparatus which incorporates an imaging element 60 in combination with a photodiode array or like linear light emitting element 108 to focus on a recording medium 112 an equisized image of an object. This recording apparatus may be employed by an electrophotographic copying machine having a photosensitive drum 114 as its recording medium in the manner shown in FIG. 35. The copier includes as usual a charger 116 for depositing an electrostatic charge on the drum 114, a cleaning unit 118, a developing unit 120, a charger 122 for image transfer and a charger lamp for charge removal. This copier is of the type which performs charge deposition, exposure, development, image transfer and charge removal during a first rotation of the drum 114 and then cleaning of the drum during a second rotation of the drum. FIG. 36 shows an imaging element 60 installed in a graphic data reading apparatus in combination with a solid scanning element 126 which may comprise an equisize line sensor using an amorphous semiconductor or so-called flat bed sensor. With this reading apparatus, a light source 128 illuminates a document 132 supported on a glass platen 130 and light beams from this document focus themselves through the focusing element 60 onto the flat bed sensor 126 to form a light image of the document. While the apparatus in FIG. 36 moves a document relative to a stationary optical system, it will move an optical system relative to a stationary document as viewed in FIG. 37 if the document takes the form of a bulky book or the like instead of a thin sheet.

An image focusing apparatus using a roof prism array achieves the following outstanding advantages.

Figure 37:
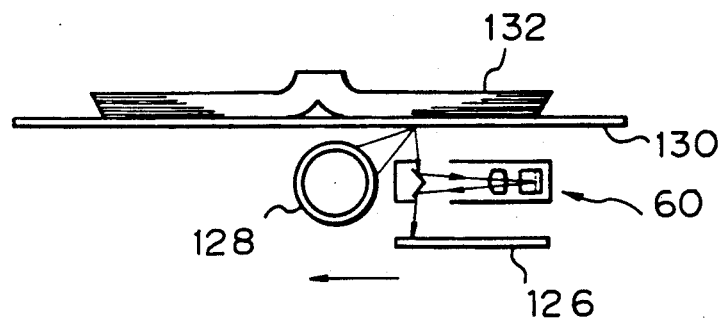

1) Possible distortion inside the plastic member does not affect the imaging performance at all.
2) A material for molding a roof prism array needs not be transparent and therefore use can be made of a sparingly distortable material which adds to the freedom of choice.
3) Provided with a substantially even thickness, a roof prism array shows least distortion and others while obtaining reflecting surfaces of excellent flatness.
4) The spacing between lenses and roof prism surfaces functions as an air medium which combined with the advantage 1) reduces flare light by eliminating conventionally observed reflection at the back of the aperture surface of a prism.
5) By determining various optical dimensions of a roof prism and lens array as discussed in connection with the embodiments, there can be provided an F number and a resolution which are far more upgraded than those of conventional strip lenses and the irregularity in the light amount distribution can be suppressed to less than 5% without assistance of special plates for compensation.
6) Use of a roof prism and lens array as an imaging element for line scan can provide a recording apparatus which is compact yet capable of having a sufficient amount of exposing light, even by combining it with a photodiode array or the like which emits a relatively limited amount of light. Such an array finds another application to a graphic data reading device as shown in FIG. 36 or 37 with the aid of an ordinary light source.

Figure 38:
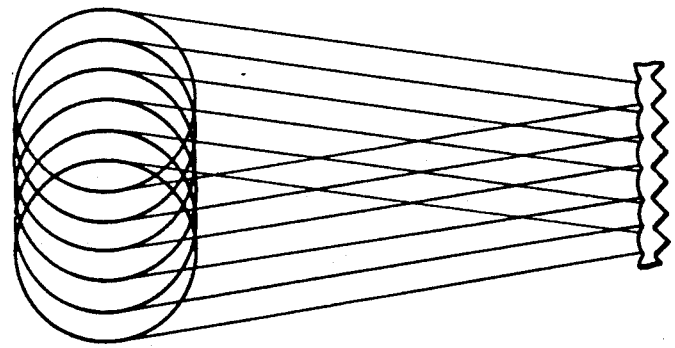
FIG. 38 represents an overlapping degree of image fragments provided by the prism and lens array of FIG. 3.

Now, where the array shown in FIG. 3 having prisms and lenses arranged most densely is used with a long focal length, the resultant fragments of an image or amounts of light will overlap to a great density as viewed in FIG. 38. As the overlap degree increases, the peripheral image portions become more overlapped and the imaging performance degrades. The long focal length on the other hand makes the resolution of each lens poor. In another aspect, such a prism lens cannot utilize light beams adjacent to the optical axis as will be seen from FIG. 1 and in practice, therefore, each lens of the array must be provided with a certain wide image angle in a direction perpendicular to the array. However, an increased image angle of each lens also promotes the overlap of the peripheral image portions along the array as illustrated in FIG. 38.

Figure 39:
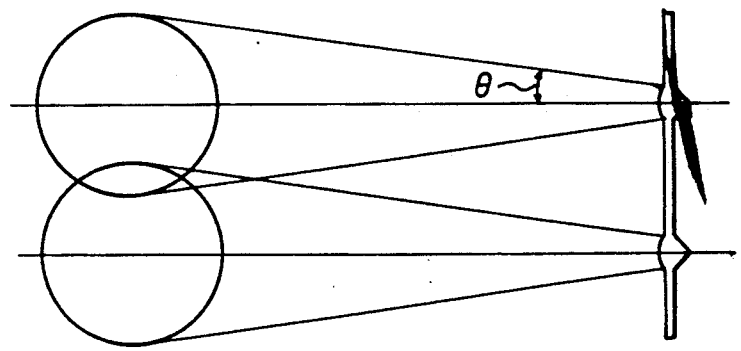
FIG. 39 represents an overlap degree provided by the prism and lens array of FIG. 4.

A possible expedient for minimizing this overlap may be in the spaced arrangement of prism lenses as shown in FIG. 39. This still involves, however, various critical problems in the aspect of practical use, not to speak of an irregular light amount distribution. Though the resolution ability may be acceptable around the optical axis of each lens, it inevitably degrades in a peripheral area of the lens (the angle $\theta$ increases up to about 20°) partly because of a fall of the resolving power in the peripheral area of the lens itself, partly because of the overlap of image fragments in regions where distortion is significant and partly because of misalignment of interlens parts of the array. The result is the degradation of the image quality in the direction of the array.

It is preferable, therefore, that an imaging element of the present invention be provided with the most dense arrangement of lenses and prisms and employ lenses each having an effective image angle which is the smallest one within an allowable range in the direction of the array and as large as possible in the other direction perpendicular to the array.

Figure 40:
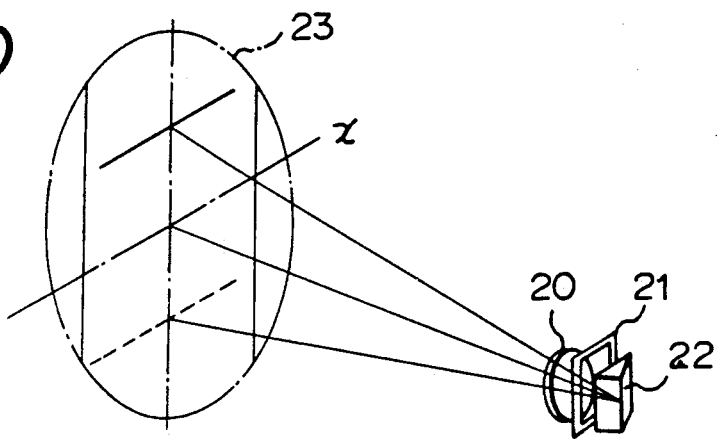
FIGS. 40-44 are diagrams explanatory of image overlap degrees provided by prism and lens assemblies applicable to the present invention.

FIG. 40 shows a screening plate 21 interposed between a lens 20 and a prism 22 to meet the demand described above. The screen 21 has a rectangular opening defined by its horizontal sides shorter than the diameter of the lens 20 and vertical sides equal to the diameter of the lens 20. A large number of such assembly of lens 20, prism 22 and screen 21 are arranged in an array horizontal to the x-axis on a plane 23 on which an image will form itself. Provision of the screens 21 constitutes prism lenses which are narrow in image angle in the x-direction parallel to the array but wide in the y-direction perpendicular to the array.

Figure 41:
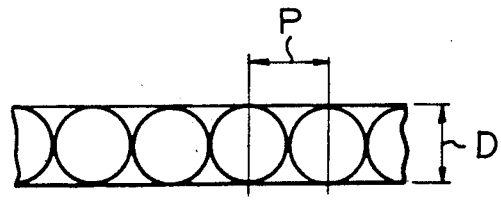

FIG. 41 is a fragmentary front view of a prism lens array demonstrating that arranging lenses as dense as possible is equalizing the distance P between neighboring lenses to the diameter D of the lenses.

Figure 42:
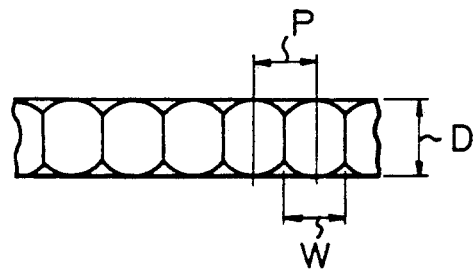
Figure 43:
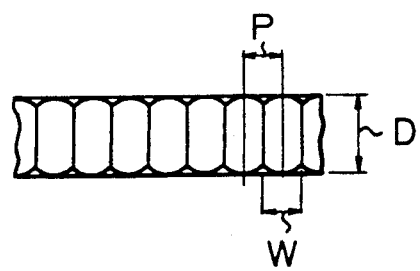
Figure 44:
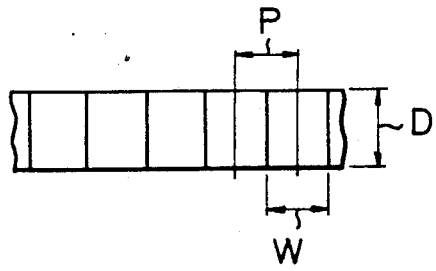
Figure 45:
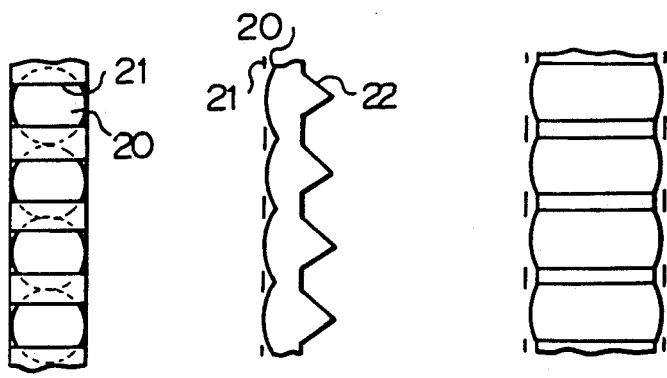
FIGS. 45-48 show other embodiments of the combination of lenses and prisms in an array applicable to the present invention for settling a problem concerned with the overlap degree.
Figure 46:
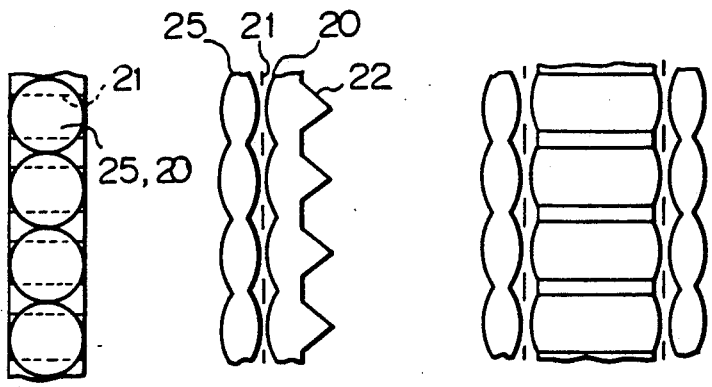
Figure 47:
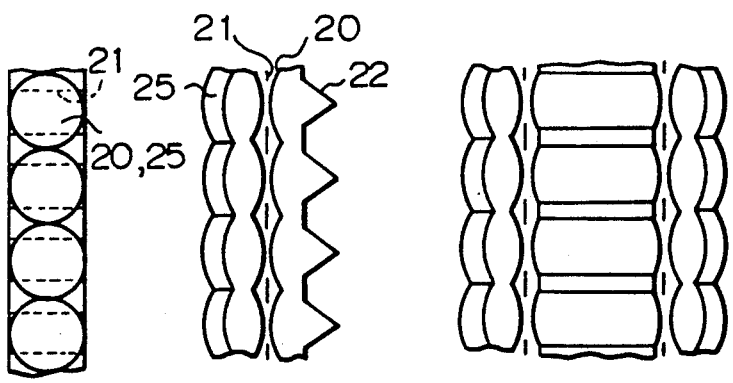
Figure 48:
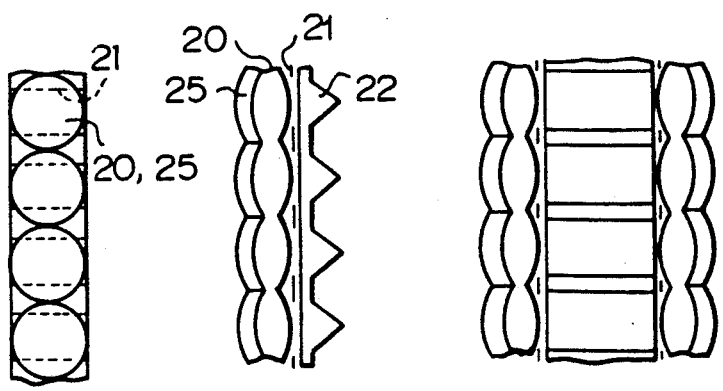

If each lens is circular, a wasteful spacing will be had between adjacent lenses and between adjacent rows. With this in view, lenses may be provided with a common generally oblong shape and lined up side by side as viewed in FIG. 42 to make up a prism lens array. This not only reduces the total wasteful spacing but settles the aforementioned problem concerning the image angle. The distance P between the lenses will be additionally shortened and therefore the light amount distribution will grow more flat, if the width W of each lens is made smaller as shown in FIG. 43. If desired, each lens may be provided with a true oblong configuration as indicated in FIG. 44. Packing a larger number of lenses in a determined range also aids in providing a sufficient amount of light. Furthermore, the image as a whole appears uniform throughout its area because a favorable part of the image adjacent to the optical axis compensates for the overlap of the peripheral image parts.

A prism and lens array applicable to the image forming apparatus according to the invention may be transformed into a composite lens system having one or more additional lenses of different radii of curvature stacked on the front ends of individual lenses. This is to improve the performance of the individual lenses proper, that is, to correct various abberations thereof. The additional lenses will also be molded in flat lens arrays. Indeed, a method of correcting abberations by increasing the number of curved surfaces as mentioned is widespread in the art of lens systems. It will prove particularly effective where lenses are formed of plastics whose refractive indexes are limited.

Figure 49:
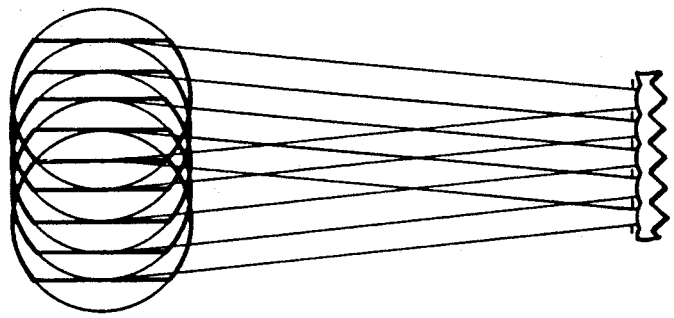
FIGS. 49 and 50 are diagrams indicating that the shape of prism apertures affects the overlap degree.
Figure 50:
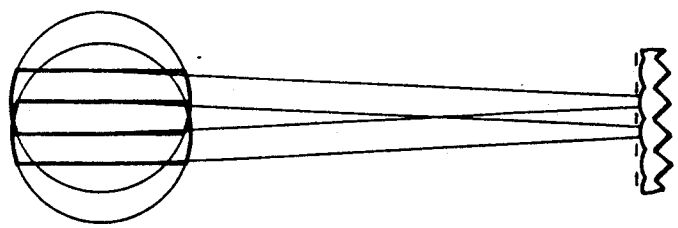

Such composite prism lens arrays are illustrated in FIGS. 45-48 by way of example. In each of these drawings, the composite array is shown in front elevation in the left-hand part, in fragmentary plan in the intermediate part and in equivalent plan without prisms. The reference numeral 20 denotes a lens array, 22 a prism array, 21 a screen array and 25 an additional lens array. Various overlap degrees are obtainable as indicated in FIGS. 49 and 50 by varying the proportion between the shorter sides to the longer sides of the oblong shape of each lens. In this case, too, the image fragments naturally overlap each other. Nevertheless, considering imaging light beams adjacent to the optical axis of the individual lenses and the overlap only in the direction of the array, the image as a whole will degrade but to an acceptable degree.

Figure 51:
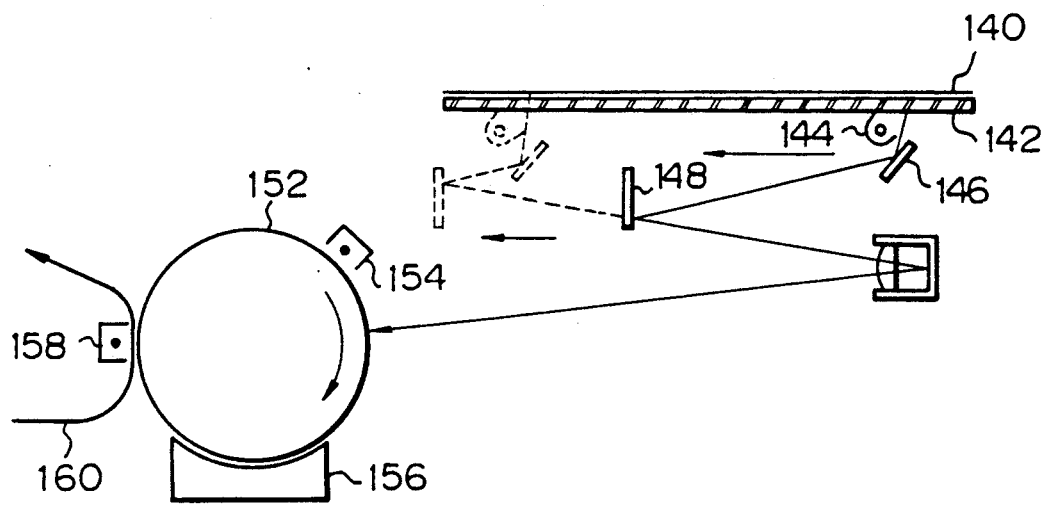
FIGS. 51 and 52 schematically illustrates a mirror scan type electrophotographic copying machine incorporating a prism and lens array of the present invention.
Figure 52:
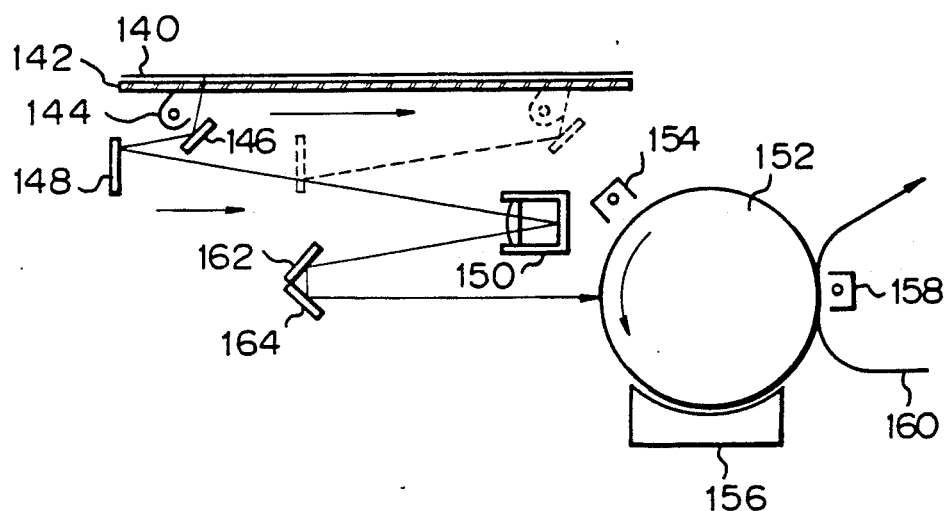

Referring to FIGS. 51 and 52, two different examples of a mirror scan type electrophotographic copying machine are shown each including an image forming apparatus which utilizes a prism lens array according to the present invention. The apparatus commonly include a glass platen 142 loaded with a document 140, a light source 144 in the form of a lamp, a first mirror 146, a second mirror 148, a prism lens array 150, a photosensitive drum 152, a charger 154, a developing unit 156 and a transfer charger 158 adapted to transfer a toner image from the drum 152 onto a transfer sheet 160. Additionally included in the apparatus of FIG. 52 are a pair of coacting mirrors 162 and 164 rigidly mounted in the optical path between the prism lens array 150 and drum 152. The prism lens array 150 forms an array parallel to the axis of rotation of the drum 152. The light source 144 and first mirror 146 move integrally at a velocity V in a direction indicated by an arrow scanning the document 140 on the platen 142. The second mirror 148 moves in the same direction as the first mirror 146 but at a velocity V/2. The drum 152 rotates at a peripheral speed V in the opposite direction to those components moving in the direction of arrow as mentioned. Where use is made of a prism lens array, its inherent image forming system requires an even number of mirrors in the case of an image transfer type copier and an odd number of mirrors in the case of direct reproduction type copier; the moving direction of the mirrors and that of the drum will be inverted. In operation, the charger 154 deposits an even electrostatic charge on the surface of the drum 152 and then image light from the document 140 scanned by the optical system with the prism array 140 projects itself onto the drum 152. This dissipates the charge on the drum in accordance with the light intensity distribution of the image light, forming an electrostatic latent image in the form of a charge pattern. The developing unit 156 supplies a developer so that colored toner particles contained in the developer adhere to the latent image on the drum to turn it into a visible toner image. This toner image is transferred to the transfer sheet 160 by the charger 158. Each of the illustrated copier also includes, though not shown, a fixing unit, a charge removing charger, a cleaning unit etc. which will operate in a well known manner.

Various optical dimensions for such an optical system may be designed as; focal length f=150 mm, lens diameter D=15 mm, lens pitch P=15 mm, F number of F/10, distance on the object side or image side of 300 mm, maximum half image angle of lens $\theta = 8-10°$, effective half image angle in the array direction $\theta_1 = 5-6°$, composite F number equivalent to F/5, aperture surface of prism of 15×8 mm.

A focal length f of about 200 mm is required of a prism lens array when it is intended to use the array with a mirror scan type copying machine. Nevertheless, a focal length of about 150 mm suffices since a prism lens array has a relatively narrow exposure width at the scan direction side and is compact as a whole. While the F number of each lens is F/10, it will presumably become identical with that of presently used in-mirror lenses as a composite F number if the overlap degree of image fragments at the image plane is made about '4'.

Figure 53:
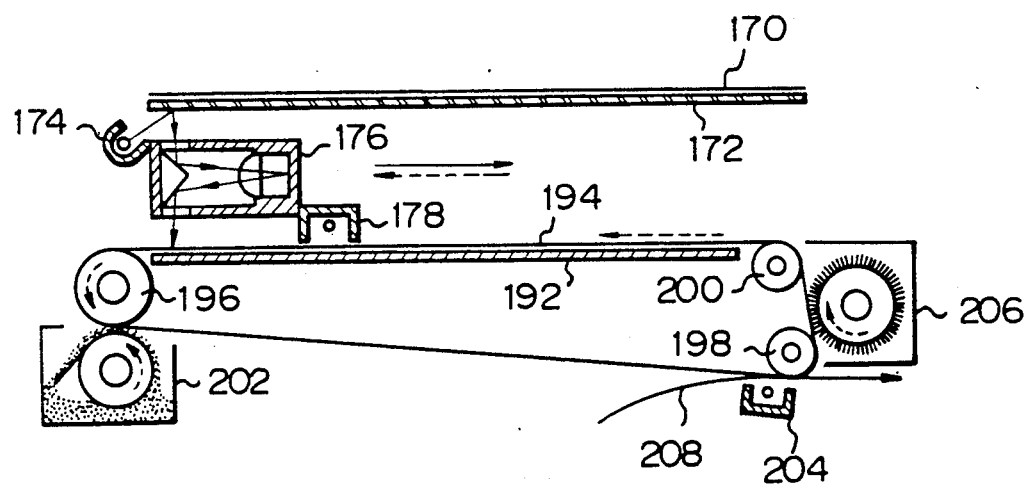
FIG. 53 schematically shows a lens box scan type electrophotographic copying machine with a prism and lens array according to the present invention.
Figure 54:
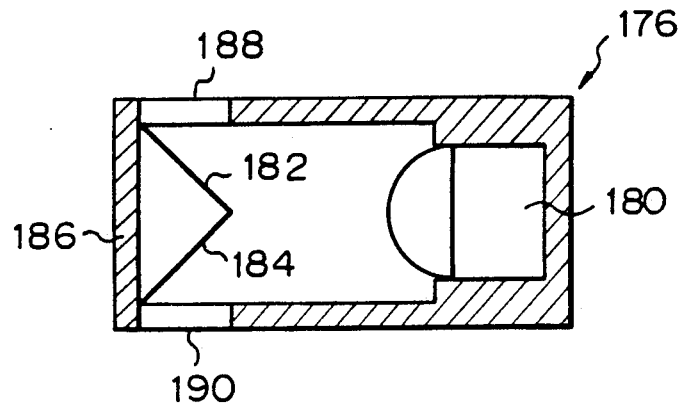
FIG. 54 is an enlarged section of a lens box included in the copier of FIG. 53.

FIG. 53 shows a lens box scan type electrophotographic copying machine utilizing a prism lens array of the kind described above. A document 170 is layed on a glass platen 172 below which a light source or lamp 174, a lens box 176 and a corona charger 178 are positioned to move a scanning stroke to the right and a return stroke to the left as an integral unit in parallel to the platen 172. As shown in detail in FIG. 54, the lens box 176 comprises a housing 186 which integrally retains therein a prism lens array 180 of the type described, a first mirror 182 reflecting light beams from the document to the array 180, and a second mirror 184 perpendicular to the first mirror 182 and projecting light beams from the array 180 onto the surface of a photosensitive element. The housing 186 is formed with an inlet slot 190 for the light beams directed to the first mirror 182 and an outlet slot 190 for the light beams reflected from the second mirror 184. Transparent sheets of glass may be fitted to the individual slots 188 and 190 to make the interior of the housing hermetic and thereby keep the mirrors and others inside the housing from contamination. The first and second mirrors may be substituted by a single triangular prism if desired.

A flat belt support 192 extends below the lens box 176 in parallel with the platen 172 such that an optical path identical in length with the optical path between the platen 172 and lens box 172 is defined between the belt support 192 and lens box 176. A photosensitive element 194 in the form of an endless belt 194 is passed over a drive roller 196 and support rollers 198 and 200 with its upper run positioned on the belt support 192. Disposed below the drive roller 196 is a developing unit 202 storing a developer therein. A corona charger 204 for image transfer is located below the support roller 198 and a cleaning unit 206 to the left and between the support rollers 198 and 200.

In operation, the charger 178, lens box 176 and light source 174 integrally move to the right in the drawing relative to the working surface of the belt 194 which remains stationary at, this stage of operation. Charge deposition and exposure thus effected at a time forms an electrostatic latent image on the belt 194 in correspondence with an image carried on the document on the platen 172. At the end of the scanning rightward stroke of this assembly 174, 176, 178, the light source 174 and charger 178 are deenergized and driven for a leftward return stroke together with the lens box 176. At this time, the belt 194 starts to run counterclockwise as viewed in the drawing moving the latent image thereon down to the developing unit 206 whereat toner particles develop the latent image. Then a transfer sheet 208 is layed on the resultant toner image on the belt and takes it thereonto under the action of the transfer charger 204. The transfer sheet 208 now carrying the toner image is separated from the belt 194 and moved to a fixing station while the belt 194 is cleared of the residual toner particles therefrom by the cleaning unit 206. The copier illustrated can be modified into the timed movement type if the lens box is fixed in place and the document and belt are moved in synchronism in the same direction.

Figure 55:
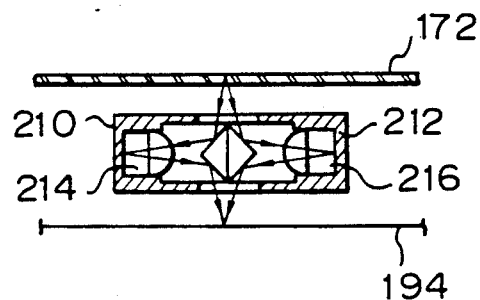
FIG. 55 shows another possible form of the lens box.
Figure 56:
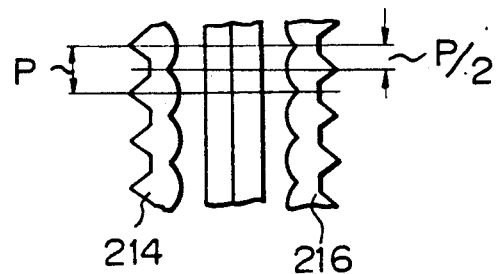
FIG. 56 is a fragmentary sectional plan of the lens box of FIG. 55.
Figure 57:
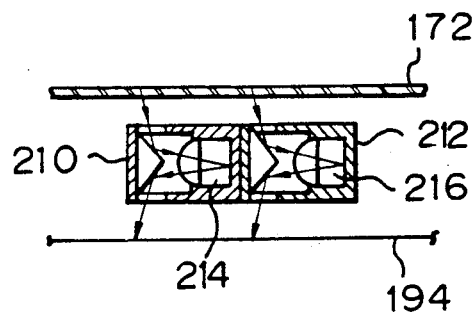
FIG. 57 shows in section still another possible form of the lens box.
Figure 58:
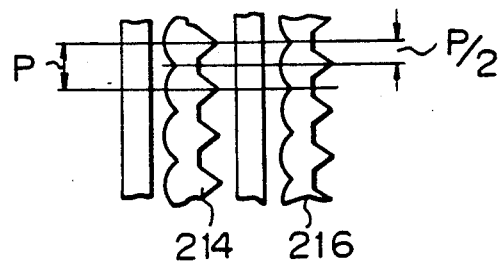
FIG. 58 is a fragmentary sectional plan of the lens box of FIG. 57.

Again, the aforementioned means may be employed for the prism lens array included in the copier of FIG. 53 for the purpose of upgrading its performance. Another possible means for compensating an irregular light amount distribution may comprise, as shown in FIG. 55, an integral symmetrical assembly of a pair of substantially identical lens boxes 210 and 212 connected face-to-face to each other. As seen in FIG. 56, prism lens arrays 214 and 216 in the individual lens boxes 210 and 212 have a common pitch P but are dislocated by a distance P/2 relative to each other. With this arrangement, the two prism lens arrays will compensate each other to provide an even light amount distribution. The lens boxes 210 and 212 may be assembled integrally but in back-to-face relation as shown in FIG. 57 instead of the discussed face-to-face relation. The P/2 dislocated relation between the prism lens arrays 214 and 216 in the lens boxes holds in this case, too, as indicated in FIG. 58. A lens box or boxes using a prism lens array of the type described is small-sized which not only lessens impacts accompanied by its movement but renders the whole apparatus compact.

Figure 59:
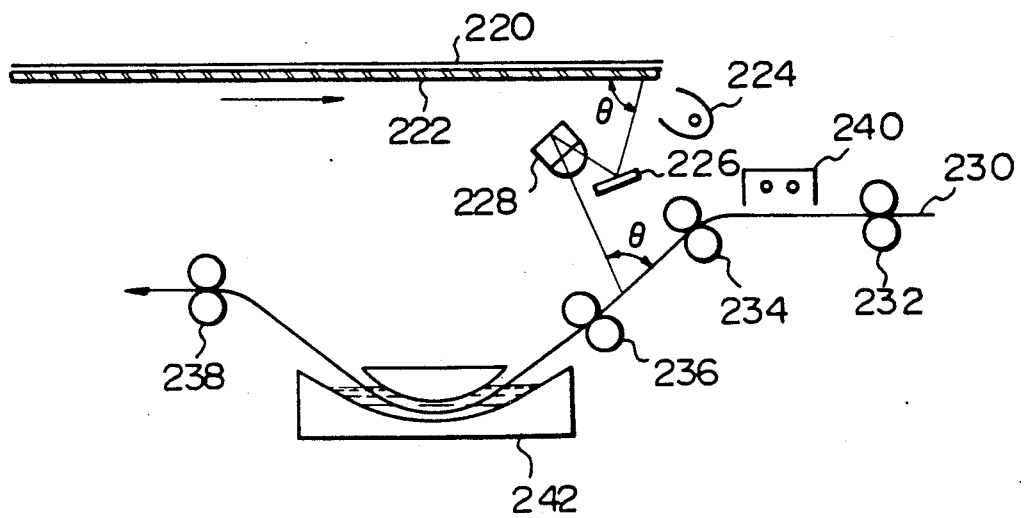
FIG. 59 schematically shows a synchronous movement type electrophotographic copying machine with a prism and lens array according to the present invention.

FIG. 59 indicates a synchronous movement type electrophotographic copying machine also employing a prism lens array according to the present invention. Different from the copiers already discussed, this copier is of the non-transfer or direct reproduction type and, thus, uses an Electrofax sheet as its photosensitive element. A glass platen 222 supporting a document 220 moves a scanning stroke to the right in the drawing and a return stroke to the left. Located below the platen 222 are a light source or lamp 224, a mirror 226 and a prism lens array 228 in their fixed positions. Rollers 232, 234, 236 and 238 advance a photosensitive sheet 230 to the left past a corona charger 240, the optical system mentioned above and a semi-moist process developing unit 242 in succession.

At a trailing side with respect to the scan stroke direction of the platen 222, the axis of reflected light from the document 220 defines an angle 8 which is equal to an angle $\theta$ defined between the axis of light coming out of the prism lens array 228 at a trailing side with respect to the moving direction of the photosensitive element 230. Though copier is shown to include a single mirror in its optical system because it is of the direct reproduction type, it is modifiable into the transfer type if an even number of mirrors are used. As the sheet 230 advances in synchronism with the platen 222, the charger charges its surface to a determined polarity and then the optical system with the array 228 successively projects a light image of the document 220 to form a latent image. The developing unit 242 develops this latent image. Finally the sheet passes through a drying station and a fixing station in a well known manner.

Various modifications will become possible for those skilled in the art after receiving the teachings of the present disclosure without departing from the scope thereof.

What is claimed is:

1. An optical imaging apparatus, comprising:

a flat multi-reflective array having a number of reflecting elements arranged in a row, each reflecting element having two symmetrical flat reflecting surfaces which face each other, are oriented at a predetermined angel to the row and intersect along a line perpendicular to the row;

a flat multi-refractive array having a number of image focusing refracting elements arranged in a row in front of the reflecting elements respectively for refracting a light image of an object disposed in a plane in front of the multi-refractive array onto the respective reflecting elements, each refracting element comprising a converging lens having a substantially spherical light refracting surface;

the refracting and reflecting elements of the multi-refractive and multi-reflective arrays being aligned with each other and arranged in such a manner as to be spaced from adjacent elements in a row direction at a predetermined distance;

the reflecting elements reflecting the light image back through the respective refracting elements, said predetermined angle of orientation between the two reflecting surfaces, a focal length of the converging lenses, a spacing between respective reflecting and refracting elements and a distance between the refracting elements and said plane being predetermined in such a manner that a focussed image of the object consisting of superposed light images from said individual refracting and reflecting elements is formed in said plane which is equal in size to said object, erect in a direction parallel to said rows and inverted in a direction perpendicular to said rows; and a light intercepting plate means disposed between the multi-refractive and multi-reflective arrays, the plate means having openings aligned with the respective elements of the multi-refractive and multi-reflective arrays which are shorter in the direction of said rows and longer in a direction perpendicular thereto.

2. An optical imaging apparatus as claimed in claim 1, in which each reflecting element comprises a prism.

3. An optical imaging apparatus as claimed in claim 1, in which each reflecting element comprises a roof prism.

4. An optical imaging apparatus as claimed in claim 1, in which the multi-refractive and multi-reflective arrays are integrally retained.

5. An optical imaging apparatus as claimed in claim 4, in which the multi-refractive and multi-reflective arrays are molded together integrally.

6. An optical imaging apparatus as claimed in claim 4, in which the multi-refractive and multi-reflective arrays are molded individually and cemented together.

7. An optical imaging apparatus as claimed in claim 4, in which the multi-refractive and multi-reflective arrays are molded individually and interconnected at a preselected spacing.

8. An optical imaging apparatus as claimed in claim 1, in which an aperture of at least one of each of the refracting and reflecting elements is oblong shaped.

9. An optical imaging apparatus as claimed in claim 1, further comprising an additional integrally formed flat multi-refractive array having a number of additional image focusing refractive elements arranged in a row and aligned with the refracting elements of the multi-refractive array.

10. An optical imaging apparatus as claimed in claim 9, in which the refracting elements of the additional flat multi-refractive array comprises lenses having a focal length which is different from said focal length of the lenses of the flat multi-refractive array.

11. An optical imaging apparatus as claimed in claim 1, in which the individual refracting elements are aligned with the individual reflecting elements along respective individual optical axis.

12. An optical imaging apparatus as claimed in claim 1, in which the predetermined distance is substantially zero.

13. An optical imaging apparatus as claimed in claim 1, in which the predetermined distance is substantially equal to an integral multiple of a size of the element.

14. An optical imaging apparatus as claimed in claim 1, in which each respective refracting and reflecting element is integrally formed.

15. An optical imaging apparatus as claimed in claim 14, in which each integral refracting and reflecting element comprises parallel narrow surfaces, each of the parallel narrow surfaces bordering the two reflecting surfaces and the refracting element.

16. An optical imaging apparatus as claimed in claim 15, further comprising a mounting means for supporting the integral refracting and reflecting elements, the mounting means being formed with a row of equidistant recesses in which the elements are fixedly retained.

17. An optical imaging apparatus as claimed in claim 16, in which each of the recesses is formed with a rectangular section in which each of the parallel narrow surfaces is fixedly retained.

18. An optical imaging apparatus as claimed in claim 1, in which the predetermined angle is 45° degrees.

19. An optical imaging apparatus, comprising:

a flat multi-reflective array having a number of reflecting elements arranged in a row, each reflecting element having two symmetrical flat reflecting surfaces which face each other, are oriented at a predetermined angle to the row and intersect along a line perpendicular to the row; and a flat, multi-reflective array having a number of image focusing refractive elements arranged in a row in front of the reflecting elements respectively for refracting a light image of an object disposed in a plane in front of the multi-refractive array onto the respective reflecting elements, each refracting element comprising a converging lens having a substantially spherical light refracting surface;

the refracting and reflecting elements of the multi-refractive and multi-reflective arrays being aligned with each other and arranged in such a manner as to be spaced from adjacent elements in a row direction at a predetermined distance;

the reflecting elements reflecting the light image back through the respective refracting elements, said predetermined angle of orientation between the two reflecting surfaces a focal length of the converging lenses, a spacing between respective reflecting and refracting elements and a distance between the refracting elements and said plane being predetermined in such a manner that a focussed image of the object consisting of superposed light images from said individual refracting and reflecting elements is formed in said plane which is equal in size to said object, erect in a direction parallel to said rows and inverted in a direction perpendicular to said rows;

each reflecting element comprising a prism;

the multi-refractive and multi-reflective arrays being integrally retained;

the apparatus further comprising a light intercepting plate means disposed between the multi-refractive and multi-reflective arrays and having substantially oblong openings aligned with the respective elements of said arrays which are shorter in the direction of said rows and longer in a direction perpendicular thereto.

* * * * *